(12) United States Patent
Nicholson et al.

(10) Patent No.: US 8,840,249 B2
(45) Date of Patent: Sep. 23, 2014

(54) METHOD, SYSTEM AND APPARATUS FOR PROJECTING VISIBLE AND NON-VISIBLE IMAGES

(75) Inventors: Stuart Nicholson, Waterloo (CA); Thomas Patrick Pawelko, Cambridge (CA); Lawrence Stewart Paul, Encino, CA (US)

(73) Assignee: Christie Digital Systems, Inc., Kitchener (CA)

( * ) Notice: Subject to any disclaimer, the term of this patent is extended or adjusted under 35 U.S.C. 154(b) by 662 days.

(21) Appl. No.: 12/289,701

(22) Filed: Oct. 31, 2008

(65) Prior Publication Data

US 2010/0110308 A1   May 6, 2010

(51) Int. Cl.
*G03B 21/26* (2006.01)
*G09B 9/08* (2006.01)
*H04N 9/31* (2006.01)
*H04N 5/74* (2006.01)
*H04N 5/33* (2006.01)

(52) U.S. Cl.
CPC .............. *H04N 5/74* (2013.01); *H04N 9/3164* (2013.01); *H04N 9/3158* (2013.01); *H04N 9/3114* (2013.01); *H04N 9/3105* (2013.01); *H04N 9/3197* (2013.01); *H04N 5/33* (2013.01)
USPC .............................................. 353/30; 434/44

(58) Field of Classification Search
CPC .......... G03B 21/26; G03B 21/14; G09B 9/36; G09B 9/32; G09B 9/323; G09B 9/326; G09B 9/302; H04N 9/3197
USPC .................. 353/69, 70, 122, 30, 55; 348/771; 345/175, 179; 434/40, 44
See application file for complete search history.

(56) References Cited

U.S. PATENT DOCUMENTS

| | | | | |
|---|---|---|---|---|
| 4,290,757 A | * | 9/1981 | Marshall et al. | 434/12 |
| 5,502,514 A | | 3/1996 | Vogeley et al. | |
| 6,971,753 B2 | * | 12/2005 | Tseng | 353/122 |

(Continued)

FOREIGN PATENT DOCUMENTS

| | | |
|---|---|---|
| EP | 0 881 843 A2 | 12/1998 |
| EP | 1 811 771 A | 7/2007 |

(Continued)

OTHER PUBLICATIONS

European Search Report dated Dec. 14, 2010 in corresponding European Patent Application 09174426.8.

(Continued)

*Primary Examiner* — William C Dowling
*Assistant Examiner* — Ryan Howard
(74) *Attorney, Agent, or Firm* — Staas & Halsey LLP

(57) ABSTRACT

A method, apparatus and system for projecting visible and non-visible images is provided. The system and apparatus include: a visible light source and a non-visible light source; at least one light modulator enabled for receiving and modulating the visible light and non-visible light to respectively form visible images and non-visible images, the non-visible images formed independent of the visible images; and projection optics enabled for receiving and co-projecting the visible and non-visible images in alignment. Furthermore, video data for projection is formed by replacing a portion of visible bits with at least a portion of non-visible bits in a data stream, such that the visible images and the non-visible images can be co-projected upon processing the video data.

17 Claims, 12 Drawing Sheets

(56) References Cited

U.S. PATENT DOCUMENTS

| | | | |
|---|---|---|---|
| 7,663,795 B2* | 2/2010 | Blackham | 359/237 |
| 8,016,425 B2* | 9/2011 | Ito | 353/31 |
| 8,348,440 B2* | 1/2013 | Burggraf et al. | 353/122 |
| 2002/0027612 A1 | 3/2002 | Brill et al. | |
| 2005/0008156 A1 | 1/2005 | Pelly | |
| 2005/0270784 A1 | 12/2005 | Hahn et al. | |
| 2006/0244925 A1 | 11/2006 | Seki et al. | |
| 2007/0076868 A1 | 4/2007 | Ming | |
| 2008/0174742 A1* | 7/2008 | Ito | 353/31 |
| 2009/0015791 A1* | 1/2009 | Chang et al. | 353/6 |
| 2009/0110231 A1 | 4/2009 | Rzeszewski et al. | |
| 2009/0180079 A1* | 7/2009 | Oakley | 353/31 |
| 2009/0253104 A1* | 10/2009 | Burggraf et al. | 434/41 |

FOREIGN PATENT DOCUMENTS

| | | |
|---|---|---|
| JP | 2003-302960 | 10/2003 |
| JP | 2005-17985 | 1/2005 |
| JP | 2005-62748 | 3/2005 |
| JP | 2007-48136 | 2/2007 |
| JP | 2008-185673 | 8/2008 |
| WO | 01/63335 | 8/2001 |
| WO | WO 2006/059681 A1 | 6/2006 |
| WO | 2007/108387 A1 | 9/2007 |

OTHER PUBLICATIONS

European Search Report dated Mar. 5, 2010 and issued in corresponding European Patent Application 09174426.8.

European Office Action dated Jun. 12, 2012 issued in related European Patent Application No. 11175161.6.

U.S. Office Action mailed Jun. 25, 2012 issued in related U.S. Appl. No. 13/370,032.

European Office Action dated May 18, 2012 issued in corresponding European Patent Application No. 09174426.8.

U.S. Notice of Allowance issued Oct. 11, 2012 in related U.S. Appl. No. 13/370,032.

European Summons to Attend Oral Proceedings Pursuant dated Dec. 12, 2012, issued in corresponding European Patent Application No. 11175161.6.

English Translation of Japanese Office Action mailed Jul. 2, 2013 in corresponding Japanese Application No. 2009-249652.

* cited by examiner

METHOD, SYSTEM AND APPARATUS FOR PROJECTING VISIBLE AND NON-VISIBLE IMAGES

FIELD

The specification relates generally to digital projectors, and specifically to a method, system and apparatus for projecting visible and non-visible images.

BACKGROUND

In recent years digital projection systems have become common in simulation and visualization environments. These projection systems are often derived from those optimized for human-visible light projection. However, there are applications, such as night vision (NVIS) applications, where projection of images in non-visible spectra is desirable. Such non-visible images are generally viewable through the use of special equipment. An example of a non-visible image is an image projected using infrared (IR) light and hence, in these instances, the non-visible images are viewable in the simulation/visualization environment through the use of NVIS goggles and/or IR image detectors.

In some IR image projection systems, the visible and IR images are projected using two separate projectors, with associated image alignment problems. Another approach is to derive the IR images from the visible images in a single projector by filtering the projected visible images via a moveable filter placed between the light modulator and the projection lens. However, in these systems, the IR image is proportional to the intensity of a given visible color, for example the red component of the visible image. However, this approach is deficient in that not all IR reflectors/radiators inherently reflect and/or radiate red light (e.g. black surfaces). Hence, in a simulation/visualization environment, either the IR images are not properly simulated, or the red component of the visible images is too intense in regions where non-red IR reflectors/radiators are being simulated.

SUMMARY

A first aspect of the specification provides a system for projecting visible and non-visible images. The system comprises a visible light source enabled to emit visible light. The system further comprises a non-visible light source enabled to emit non-visible light. The system further comprises at least one light modulator enabled to receive and modulate the visible light and the non-visible light to respectively form visible images and non-visible images, the non-visible images formed independent of the visible images. The system further comprises projection optics enabled to receive and co-project the visible and non-visible images in alignment.

The system can further comprise a processing unit enabled to control the at least one light modulator to modulate the non-visible light to form the non-visible images independent of the visible images.

The system can further comprise a plurality of light modulators, each of the plurality of light modulators enabled to receive and modulate a respective component of the visible light to form a respective component of the visible images. The system can further comprise a plurality of visible light sources, including the visible light source, in a one-to-one relationship with the plurality of light modulators, each of the plurality of visible light sources enabled to emit the respective component of the visible light. The system can further comprise: a broadband light source comprising the visible light source and the non-visible light source; and a spectrum splitter enabled to split light from the broadband light source into the non-visible light and each respective component of the visible light. The spectrum splitter can comprise at least one of at least one prism and at least one dichroic filter.

The at least one light modulator can comprise: at least one visible light modulator enabled to receive and modulate the visible light to form the visible images; and a non-visible light modulator enabled to receive and modulate the non-visible light to form the non-visible images independent of the visible images. The system can further comprise: a broadband light source comprising the visible light source and the non-visible light source; and a light filter enabled to separate light from the broadband light source into the non-visible light and a plurality of components of the visible light, in a sequence coordinated with modulation of the non-visible light to form non-visible images independent of the visible images. The light filter can comprise: a plurality of visible light filters, each enabled to transmit one of each respective component of the visible light and substantially block transmission of the non-visible light; and a non-visible light filter enabled to transmit the non-visible light and substantially block the visible light. The light filter can comprise a color wheel.

The system can further comprise a plurality of visible light sources, including the visible light source, each of the plurality of visible light sources enabled to emit a respective component of the visible light. The plurality of visible light sources and the non-visible light source can be enabled to emit each respective component of the visible light and the non-visible light in a sequence coordinated with modulation of the non-visible light to form non-visible images independent of the visible images. The at least one visible light modulator can be further enabled to receive light from each red, green and blue light source and modulate the visible light to form visible images The at least one visible light source can comprise at least one of a red, green and blue light sources, and the non-visible light source can comprise at least one of an infrared and ultra-violet light source.

A second aspect of the specification provides a light source assembly for providing light to a projector enabled to project visible and non-visible images. The projector includes at least one light modulator enabled to receive and modulate visible light and non-visible light to respectively form visible images and non-visible images, the non-visible images formed independent of the visible images, and projection optics enabled to receive and co-project the visible and non-visible images in alignment. The light source assembly comprises a visible light source enabled to emit visible light. The light source assembly further comprises a non-visible light source enabled to emit non-visible light. The light source assembly further comprises an optical interface enabled to transmit the visible and non-visible light to the projector. The light source assembly further comprises a communication interface enabled to receive a coordinating signal. The light source assembly further comprises a processing unit connected to the interface, the processing unit enabled to process the coordinating signal and, in response, coordinate transmission of the visible light and non-visible light to the projector with the modulation of the visible light and non-visible light, such that the non-visible images are formed independent of the visible images at the projector.

A third aspect of the specification provides a method for combining non-visible data and visible data for a projector enabled to project visible images and non-visible images. The method comprises receiving visible bits representative of the visible images to be projected by the projector in a visible light spectrum. The method further comprises receiving non-visible bits representative of the non-visible images to be projected by the projector in a non-visible light spectrum. The method further comprises replacing a portion of the visible bits with at least a portion of the non-visible bits in video data such that the visible images and the non-visible images can be co-projected by the projector upon processing the video data.

The visible bits can comprise red, green and blue color bits, and the video data can comprise frames. Each frame can comprise the red, green and blue color bits. Replacing a portion of the visible bits with at least a portion of the non-visible bits in the video data can comprise replacing one of the red, green and blue color bits with the non-visible bits. Replacing one of the red, green and blue color bits with the non-visible bits can comprise replacing a portion of one of the red, green and blue color bits with a portion of the non-visible bits. Replacing one of the red, green and blue color bits with the non-visible bits can comprise alternating replacing one of the red, green and blue color bits with most significant non-visible bits and least significant non-visible bits in successive frames of the video data. Replacing one of the red, green and blue color bits with most significant non-visible bits and least significant non-visible bits in successive frames of the video data can comprise replacing a portion of one of the red, green and blue color bits with the most significant non-visible bits and the least significant non-visible bits in the successive frames of the video data. Replacing one of the red, green and blue color bits with the non-visible bits can comprise replacing the blue bits with the non-visible bits in every second frame of the video data.

Replacing a portion of the visible bits with at least a portion of the non-visible bits in the video data can comprise alternating between replacing a first one of the red, green and blue bits with the non-visible bits and replacing a second one of the red, green and blue bits with the non-visible bits in successive frames of the video data. The method can further comprise replacing a third one of the red, green and blue bits with the non-visible bits in further successive frames of the video data.

Replacing a portion of the visible bits with at least a portion of the non-visible bits in the video data can comprise replacing the red, green and blue bits with at least a portion of the non-visible bits in alternating successive frames of the video data. Replacing the red, green and blue bits with the at least a portion of the non-visible bits in alternating successive frames of the video data can comprise replacing a first one of the red, green and blue bits with a first portion of the non-visible bits and replacing a second one of the red, green and blue bits with a second portion of the non-visible bits in the successive frames of the video data, the first portion being less significant than the second portion. The method can further comprise replacing a third one of the red, green and blue bits with one of the second portion and a third portion of the non-visible bits in the successive frames of the video data, the second portion being less significant than the third portion.

Replacing a portion of the visible bits with at least a portion of the non-visible bits in the video data can comprise replacing two of the red, green and blue color bits with the non-visible bits in each frame, such that remaining visible bits comprise monochrome images. Replacing two of the red, green and blue color bits with the non-visible bits can comprise replacing a first one of the red, green and blue color bits with most significant non-visible bits and replacing a second one of the red, green and blue color bits with least significant non-visible bits. The remaining visible bits can comprise at least one of a combination of red, green and blue data transformed into monochrome data according to a pre-determined algorithm, and originally generated monochrome data.

A fourth aspect of the specification provides an image generator for combining non-visible data and visible data, for a projector enabled to project visible images and non-visible images. The image generator comprises an interface enabled to transmit video data to the projector. The image generator further comprises a processing unit. The processing unit is enabled to receive visible bits representative of the visible images to be projected by the projector in a visible light spectrum. The processing unit is further enabled to receive non-visible bits representative of the non-visible images to be projected by the projector in a non-visible light spectrum. The processing unit is further enabled to replace a portion of the visible bits with at least a portion of the non-visible bits in the video data such that the visible images and the non-visible images can be co-projected by the projector upon processing the video data.

BRIEF DESCRIPTIONS OF THE DRAWINGS

Embodiments are described with reference to the following figures, in which.

DETAILED DESCRIPTION OF THE EMBODIMENTS

Figure 1:
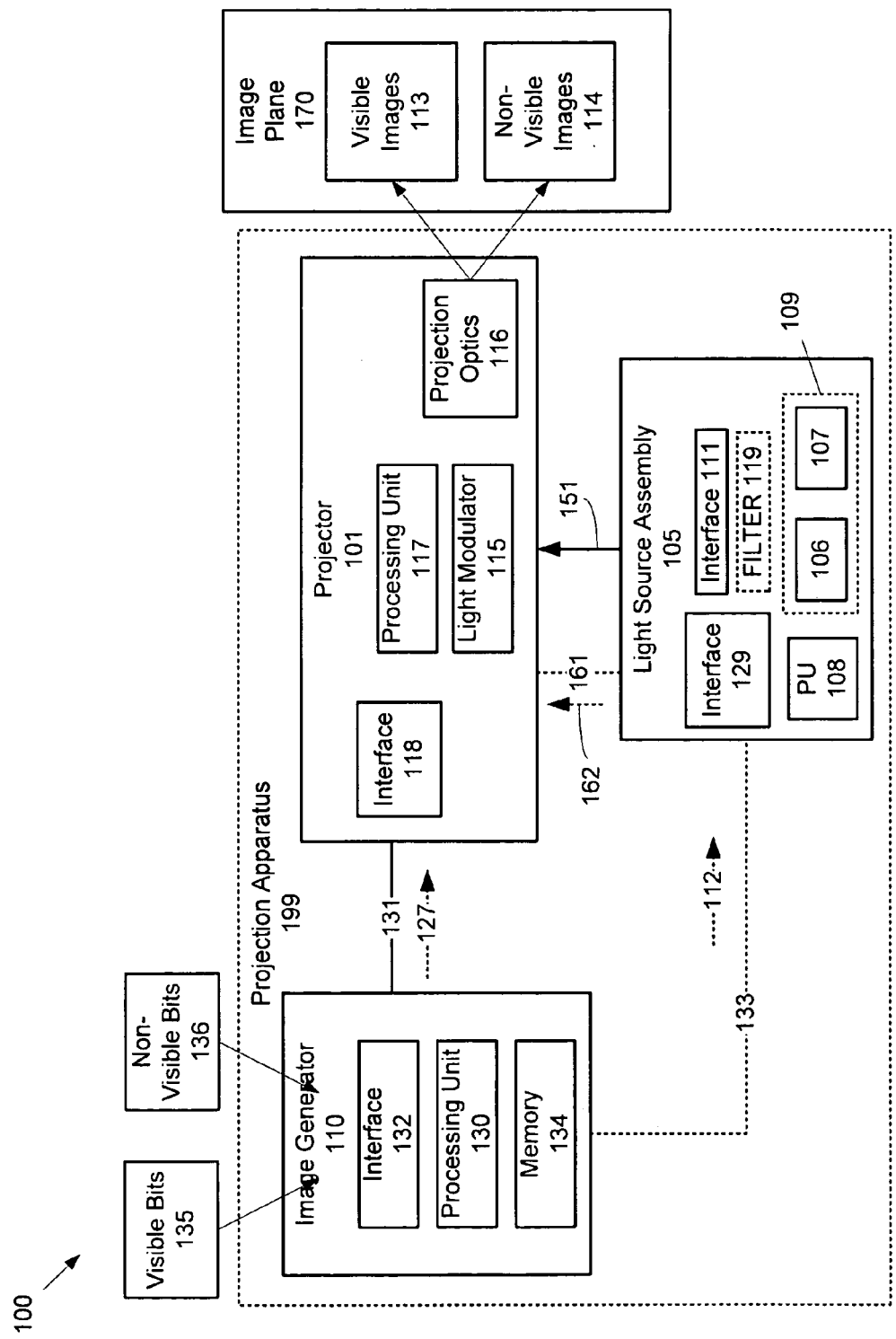
FIG. 1 depicts a system for projecting visible images and non-visible images, according to non-limiting embodiments.

FIG. 1 depicts a system 100 for projecting visible images 113 and non-visible images 114, according to non-limiting embodiments, the system 100 comprising a projector 101, a light source assembly 105 and an image generator 110. The light source assembly 105 comprises a visible light source 106 for emitting visible light (i.e. light in the visible light spectrum from about 380 to 750 nm, or a subset of the visible light spectrum) and a non-visible light source 107 for emitting non-visible light (i.e. light outside of the visible light spectrum, such as infrared and/or ultraviolet light). In some embodiments, as described below, the visible light source 106 and the non-visible light source 107 can be combined in a single broadband light source 109. In some embodiments the system 100 can comprise the single visible light source 106 (e.g. monochrome systems), while in other embodiments, the system 100 can comprise a plurality of visible light sources, each for emitting a respective component of visible light (e.g. see FIG. 3)

In some embodiments, the light source assembly 105 can include a filter 119 for filtering light from the broadband light source 109, and/or the visible light source 106 and the non-visible light source 107, such that only a visible or non-visible component of light is being conveyed to the projector 101 at any given time.

In some embodiments, as further described below, the visible light source 106 comprises a plurality of visible light sources, for example red, green and blue light sources (e.g. LEDs and the like). In further embodiments, the non-visible light source 107 can include, but is not limited to, at least one of an infrared (IR) light source and an ultraviolet (UV) light source. In any event, the non-visible light source is compatible with a non-visible image viewing apparatus, such as night vision goggles and/or an IR image detector, used in viewing the non-visible images 114.

The light source assembly 105 can also include a processing unit 108, a power supply (not depicted) and an interface 111. The interface 111 comprises an optical interface 111 for transmitting visible and non-visible light from the visible light source 106 and the non-visible light source 107, respectively, to the projector 101. In FIG. 1, the transmission of light from the light source assembly 105 to the projector 101 is represented by the arrow 151. The interface 111 can include an optical combiner. In some embodiments, the light source assembly 105 can also include a communication interface 129 for receiving a coordinating signal 112, for example from the projector 101 and/or from the image generator 110 (as depicted). In these embodiments, the processing unit 108 is connected to the communication interface 129 and enabled for processing the coordinating signal 112 and, in response, coordinating transmitting the visible and non-visible light to the projector 101, such that the projector 101 can modulate the non-visible light to form the non-visible images 114 and modulate the visible light to form the visible images 113, independently, as will be described below.

The projector 101 comprises at least one light modulator 115 enabled for receiving and modulating the visible light to form the visible images 113. In these embodiments, the at least one light modulator 115 is further enabled for receiving and modulating the non-visible light to form the non-visible images 114 independent of the visible images 113. However, in other embodiments the projector 101 can include at least one non-visible light modulator (e.g. as in FIGS. 4 and 5, described below) for forming the non-visible images 114. In any event the projector 101 comprises a light modulator for receiving and modulating the visible light to form the visible images 113 and a non-visible light modulator for receiving and modulating the non-visible light to form the non-visible images 114 independent of the visible images 113, which can be the same light modulator or a different light modulator, as desired.

The light modulator 115 can be any suitable light modulator, including but not limited to a DMD (digital micromirror device), an LCD (liquid crystal display) and an LCOS (liquid crystal on silicon) device.

The projector 101 further comprises projection optics 116 enabled for receiving and co-projecting the visible images 113 and non-visible images 114. While FIG. 1 depicts the visible images 113 and the non-visible images 114 as being projected in different directions, it is understood that they have been depicted as such for clarity only. Indeed, it is further understood that each of the visible images 113 and the non-visible images 114 are projected in the same image plane 170 and are substantially aligned, as each is being transmitted using the same projection optics 116. Hence, a viewer viewing the image plane 170 with and without non-visible image viewing apparatus (e.g. NVIS goggles) will observe that the non-visible images 114 and the visible images 113, respectively, are in alignment.

The projector 101 further comprises a processing unit 117 for controlling the light modulator 115 in modulating the non-visible light to form the non-visible images 114 independent of the visible images 113. The projector 101 further comprises an interface 118 for receiving video data 127 from the image generator 110. The projector 101 can further comprise integration optics, memory, sensors, a light dump/heat sink, a power supply and/or any other suitable components.

The image generator 110 comprises a processing unit 130, a communication interface 132 and, in some embodiments, a memory 134. The processing unit 130 is enabled for receiving visible bits 135, the visible bits 135 representative of the visible images 113 to be projected by the projector 101. The visible bits 135 can represent color or monochrome images, as desired. The image generator 110 is further enabled to receive non-visible bits 136, the non-visible bits 136 representative of the non-visible images 114 to be projected by the projector 101. The processing unit 130 is yet further enabled to replace a portion of the visible bits 135 with at least a portion of the non-visible bits 136 in the video data 127, such that the visible images 113 and the non-visible images 114 can be co-projected by the projector 101 upon processing the video data stream 127.

Various embodiments of replacing a portion of the visible bits 135 with at least a portion of the non-visible bits 136 are described below with respect to FIGS. 8-16.

In some embodiments the image generator 110 can further comprise an interface 132 for communicating with the projector 101, and specifically for conveying the video data 127 to the projector 101 via a link 131. In some embodiments, the interface 132 can be enabled to receive the visible bits 135 and the non-visible bits 136 from another apparatus, for example a database and/or external video sources (such as simulation/visualization equipment, not depicted) and conveying the visible bits 135 and the non-visible bits 136 to the processing unit 130, such that the processing unit 130 receives the visible bits 135 and the non-visible bits 136.

In yet further embodiments, the visible bits 135 and the non-visible bits 136 can be stored in the memory 134 and received by the processing unit 130 upon retrieval by the processing unit 130.

The link 131 can be any suitable wired or wireless link suitable for conveying the video data 127 to the projector 101. Furthermore, the link 131 can comprise a wired or wireless communications network (not depicted), as desired, such that the image generator 110 and the projector 101 can be located remotely or locally. The interface 132 is generally complementary to the link 131, such that the video data 127 can be conveyed in a wired or wireless manner, as desired.

In yet further embodiments, the image generator 110 and the light source assembly 105 are in communication via a link 133, such that the coordinating signal 112 can be conveyed to the light source assembly 105, the processing unit 130 further enabled to generate and transmit the coordinating signal 112 via the interface 132 and the link 133. The interface 132 is further enabled for conveying the coordinating signal 112 to the light source assembly 105.

The link 133 can be any suitable wired or wireless link suitable for conveying the coordinating signal 112 to the light source assembly 105. Furthermore, the link 133 can comprise a wired or wireless communications network (not depicted), as desired, such that the image generator 110 and the light source assembly 105 can be located remotely or locally. The interface 132 is generally complementary to the link 133, such that the coordinating signal 112 can be conveyed in a wired or wireless manner, as desired.

In yet further embodiments, the projector 101 and the light source assembly 105 are in communication via a link 161, such that a coordinating signal 162 can be conveyed to the projector 101 from the light source assembly 105, the processing unit 108 further enabled to generate and transmit the coordinating signal 162 via the interface 129 and the link 161. The interface 129 is further enabled for conveying the coordinating signal 162 to the projector 101. The link 161 can be similar to the link 131 and/or the link 133.

In other embodiments, the coordinating signal 162 can be conveyed to the projector 101 via the links 133 and 131 (i.e. via the image generator 110).

In yet further embodiments, the coordinating signal 112 can be conveyed to the light source assembly 105 via the link 161.

In any event, each of the projector 101, the light source assembly 105 and the image generator 110 are enabled to convey appropriate coordinating signals to each other, as desired.

In some embodiments, the projector 101, the light source assembly 105 and the image generator 110 can be combined in a single projection apparatus 199. In these embodiments, each of the projector 101, the light source assembly 105 and the image generator 110 can be enabled to share resources. For example, in some embodiments, the projection apparatus 199 can comprise one or more processing units, one or more memories etc. shared by each of the projector 101, the light source assembly 105 and the image generator 110. Furthermore, rather than the interfaces 118, 129 and 132, the projection apparatus 199 can comprise a computer bus for conveying the signals 112 and the video data 127, and optical components for conveying the visible and non-visible light to the light modulator 115.

Furthermore, it is understood that any combination of the projector 101, the light source assembly 105 and the image generator 110 can be integrated into a single apparatus and enabled to communicate with the remaining elements in the system 100.

In any event, the video data 127 (comprising the visible bits 135 and the non-visible bits 136) is produced by the image generator 110, and conveyed to the projector 101. The light modulator 115 is controlled to modulate the visible and non-visible light received from the light source assembly 105. The light source assembly 105 can be controlled to generate and/or transmit (e.g. arrow 151) visible and non-visible light in a sequence that is coordinated with control of the light modulator 115. For example when visible light is being conveyed to the light modulator 115, the light modulator 115 controlled to modulate visible light, and when non-visible light is being conveyed to the light modulator 115, the light modulator 115 controlled to modulate non-visible light. The visible images 113 and non-visible images 114 are then both projected onto the image plane 170 by the projection optics 116, without the alignment problems associated with a two projector system. Furthermore, such control, modulation and projection are generally performed at video speeds, such that to a viewer, the visible images 113 and non-visible images 114 are viewable simultaneously. As the non-visible images 114 are formed independent of the visible images 113, there is no dependency of the non-visible images 114 on the visible images 113.

Figure 2:
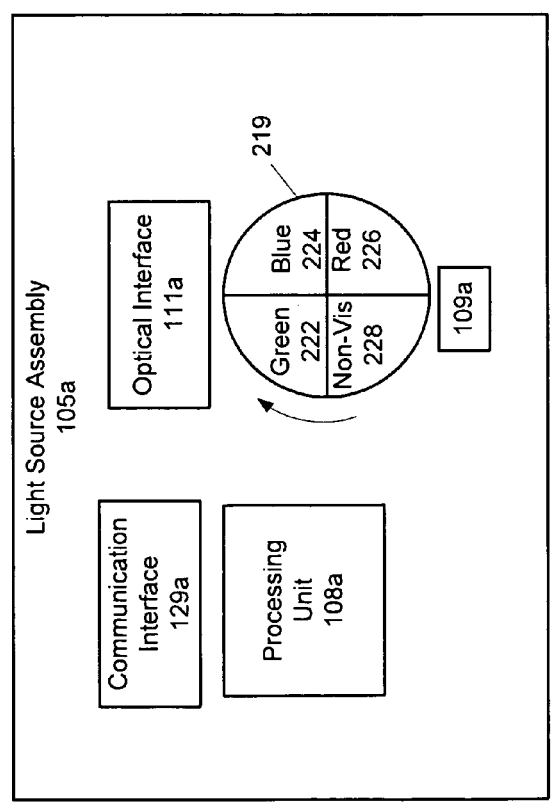
FIG. 2 depicts a light source assembly for providing visible and non-visible light to a projector, according to non-limiting embodiments.

Attention is now directed to FIG. 2 which depicts a light source assembly 105a for providing visible and non-visible light to the projector 101, according to non-limiting embodiments. It is understood that the light source assembly 105a can be substituted into the system 100, in place of the light source assembly 105.

The light source assembly 105a comprises an optical interface 111a, similar to the interface 111, a communication interface 129a, similar to interface 129, and a processing unit 108a similar to the processing unit 108. The light source assembly 105a further comprises a broadband light source 109a, similar to the broadband light source 109, the broadband light source 109a for emitting visible and non-visible light, and can include any suitable broadband light source including but not limited to an incandescent lamp, a halogen lamp, a xenon arc lamp, a metal halide lamp, a sodium vapour lamp, and the like.

The light source assembly 105a further comprises a filter 219 comprising a plurality of visible light filters 222, 224 and 226, each enabled to transmit one of a respective component of visible light and substantially block transmission of non-visible light. The filter 219 further comprises a non-visible light filter 228 (e.g. an IR filter or a UV filter) enabled to transmit non-visible light and substantially block visible light. In some non-limiting embodiments, the filter 219 comprises a green filter 222, a blue filter 224, a red filter 226 and the non-visible light filter 228. In some non-limiting embodiments, the filters 222-228 are arranged as sections of a circle such that the filter 219 comprises a color wheel. There can be more or fewer filters as desired, arranged in any suitable order as long as at least one visible and at least one non-visible filter is included. Furthermore, the visible light filters 222-226 can be enabled to filter any suitable group of colors, including but not limited to cyan, magenta and yellow (as in the CMYK color system).

In any event, the filter 219 is located between the broadband light source 109a and the optical interface 111a, and the filter 219 is enabled to separate light from the broadband light source 109a into non-visible light (e.g. IR or UV) and a plurality of components of the visible light (i.e. red, green and blue), in a sequence coordinated with modulating the non-visible light to form the non-visible images 114, independent of the visible images 113, at the light modulator 115. Hence, the filter 219 rotates in a given direction and filters light from the broadband light source 109a in a sequence. The coordinating signal 112 can be processed by the processing unit 108a to determine which component of light is to be transmitted to the projector 101 at any given time, and hence determine the position of the rotational position of the filter 219. Alternatively, the position of filter 219 can be determined by the processing unit 108a and communicated to the projector 101 via the link 161, such that the processing unit 117 can coordinate sending appropriate image data to the light modulator 115.

Figure 3:
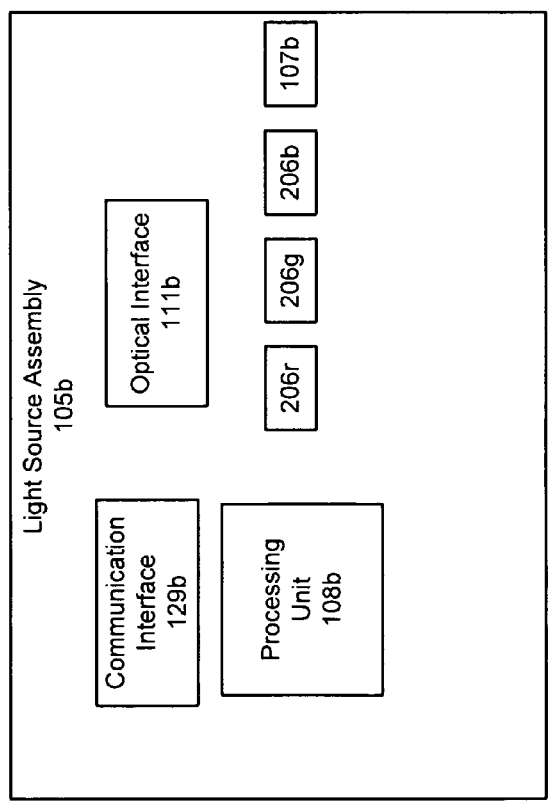
FIG. 3 depicts a light source assembly for providing visible and non-visible light to a projector, according to non-limiting embodiments.

Attention is now directed to FIG. 3 which depicts a light source assembly 105b for providing light to the projector 101, according to non-limiting embodiments. It is understood that the light source assembly 105b can be substituted into the system 100, in place of the light source assembly 105.

The light source assembly 105b comprises an optical interface 111b, similar to the interface 111, a communication interface 129b, similar to interface 129, and a processing unit 108b similar to the processing unit 108. The light source assembly 105b further comprises a plurality of visible light sources 206r, 206g and 206b, each of said plurality of visible light sources 206r, 206g and 206b enabled for emitting a respective component of visible light. For example, each of the visible light sources 206r, 206g and 206b can be enabled for emitting red, green and blue light respectively, though any suitable group of colors can be emitted. In some non-limiting embodiments, each of the visible light sources 206r, 206g and 206b comprises an LED (light emitting diode). The light source assembly 105b further comprises a non-visible light source 107b, similar to the non-visible light source 107.

In any event, the plurality of visible light sources 206r, 206g and 206b and the non-visible light source 107b are further enabled for emitting each respective component of visible light and non-visible light in a sequence coordinated with modulating the non-visible light to form non-visible images independent of the visible images at the light modulator 115. The coordinating signal 112 can be processed to determine which respective component of light is to be transmitted to the projector 101 at any given time and hence control which of the visible light sources 206r, 206g and 206b and the non-visible light source 107b are to be turned on and/or off at any given time. Hence, in these embodiments, the projector 101 generally controls the light sources 206r, 206g, 206b and 107b.

Figure 4:
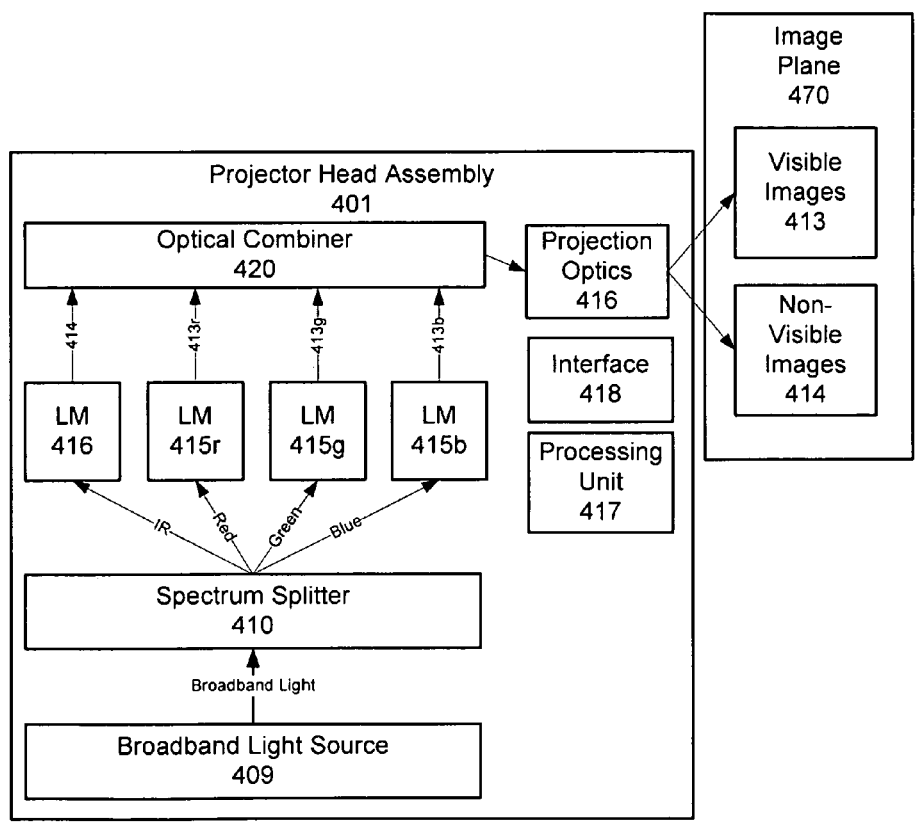
FIG. 4 depicts a projector head assembly for providing for projecting visible images and non-visible images, according to non-limiting embodiments.

Attention is now directed to FIG. 4 which depicts a projector head assembly 401, according to non-limiting embodiments. In some embodiments, the projector head assembly 401 combines the functionality of the projector 101 and the light source assembly 105. Hence, it is understood that the projector head assembly 401 can be substituted into the system 100, in place of the projector 101 and the light source assembly 105.

The projector head assembly 401 is generally enabled to communicate with the image generator 110, for example to receive the video data 127. The projector head assembly 401 comprises a processing unit 417, similar to a combination of the processing units 108 and 117, and an interface 418, similar to a combination of the interfaces 118 and 129. The projector head assembly 401 further comprises projection optics 416, similar to the projection optics 116, for projecting visible images 413 and non-visible images 414 in an image plane 470.

The projector head assembly 401 further comprises a broadband light source 409, similar to the broadband light source 109a, and a spectrum splitter 410, the spectrum splitter 410 for splitting light from the broadband light source 409 into non-visible light (e.g. IR light) and respective components of visible light, for example red, green and blue components. In some embodiments, the spectrum splitter 410 comprises, at least one of, at least one prism and at least one dichroic filter (not pictured).

The projector head assembly 401 further comprises a plurality of light modulators 415r, 415g, 415b, each of the plurality of light modulators 415r, 415g, 415b enabled for receiving and modulating a respective component of visible light from the spectrum splitter 410 to form a respective component (413r, 413g, 413b) of visible images 413. The projector head assembly 401 further comprises at least one non-visible light modulator 416, which can be similar to the light modulator 115, however the at least one non-visible light modulator 416 is enabled for receiving and modulating non-visible light from the spectrum splitter to form the non-visible images 414 independent of the visible images 413. For example, the at least one non-visible light modulator 416 can be enabled to modulate infrared (IR) and/or ultraviolet (UV) light. In some embodiments, the projector head assembly 401 can comprise a plurality of non-visible light modulators, which can be similar to non-visible light modulator 416, each of the plurality of non-visible light modulators enabled to modulate different (and/or the same) spectra of non-visible light. In these embodiments, the spectrum splitter 410 is further enabled to split the broadband light into a plurality of non-visible light spectra. For example, the projector head assembly 401 can comprise at least a first non-visible light modulator for modulating IR light, and a second non-visible light modulator for modulating UV light. Other combinations of non-visible light modulators for modulating non-visible light (e.g. different ranges of IR and/or UV light) are within the scope of present embodiments.

The projector head assembly 401 further comprises an optical combiner 420 enabled for combining the non-visible images 414 and respective components (413r, 413g, 413b) of the visible images 413 from the light modulators 416 and 415r, 415g, 415b, respectively and directing the combined images to the projection optics 416. The projection optics 416 are enabled to focus the non-visible images 414 and visible images 413 onto the image plane 470. For example, in some embodiments, the optical combiner 420 can comprise at least one of a dichroic filter and a beam splitter, each used in a combining mode. Other suitable optical combiners are within the scope of present embodiments. As in FIG. 1, while FIG. 4 depicts the visible images 413 and the non-visible images 414 as being projected in different directions, it is understood that they have been depicted as such for clarity only. Indeed, it is further understood that each of the visible images 413 and the non-visible images 414 are projected in the image plane 470 and are substantially aligned. Hence, a viewer viewing the image plane 470 with and without non-visible image viewing apparatus (e.g. NVIS goggles) will observe that the non-visible images 414 and the visible images 413, respectively, are in alignment.

Each of light modulators 415r, 415g, 415b and the non-visible light modulator 416 can be controlled to operate in parallel or in sequence as desired.

Figure 5:
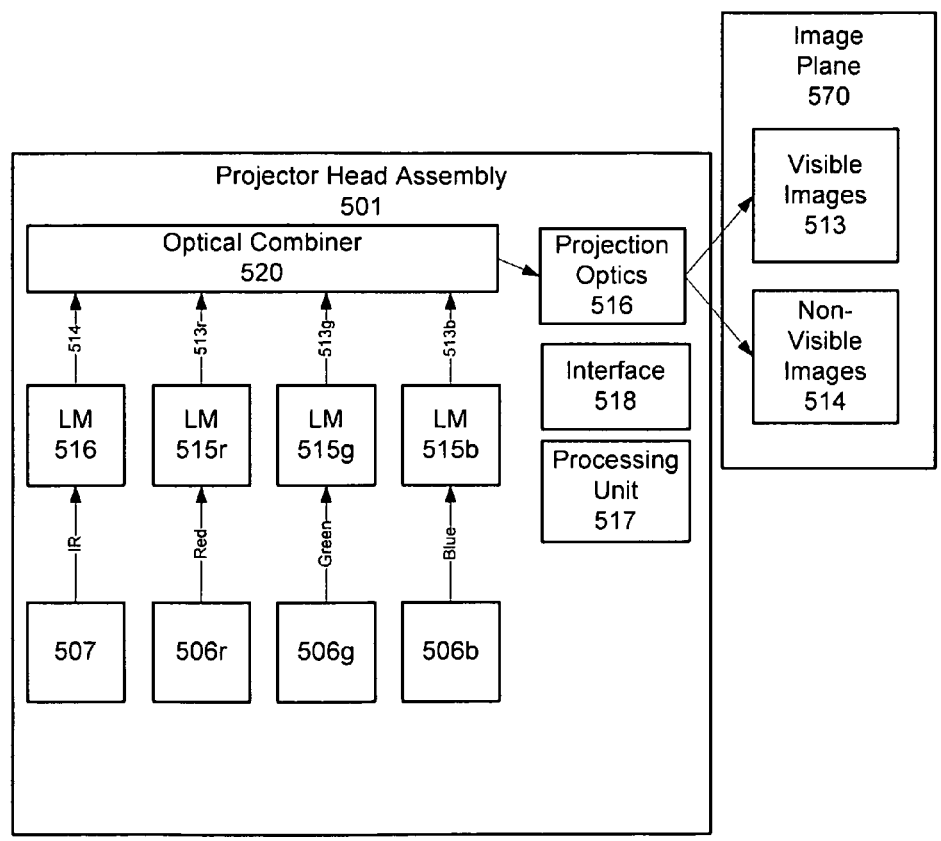
FIG. 5 depicts a projector head assembly for providing for projecting visible images and non-visible images, according to non-limiting embodiments.

Attention is now directed to FIG. 5 which depicts a projector head assembly 501, according to non-limiting embodiments. It is understood that the projector head assembly 501 can be substituted into the system 100, in place of the projector 101 and the light source assembly 105. The projector head assembly 501 is similar to the projector head assembly 401, with like components having like numbering except preceded by a "5" rather than a "4". For example, the interface 518 is similar to the interface 418, and processing unit 517 is simular to processing unit 417.

However, the projector head assembly 501 comprises at least one non-visible light source 507 (e.g. IR and/or UV light sources) and a plurality of visible light sources 506r, 506g and 506b. The at least one non-visible light source 507 and the plurality of visible light sources 506r, 506g, 506b are in a one-to-one relationship with the at least one non-visible light modulator 516 and the plurality of light modulators 515r, 515g and 515b, respectively, each of the plurality of visible light sources 506r, 506g, 506b is enabled for emitting a respective component of visible light. For example, in non-limiting embodiments, the plurality of visible light sources 506r, 506g, 506b are enabled for emitting red, green and blue light respectively. Furthermore, each of the at least one non-visible light source 507 and the plurality of visible light sources 506r, 506g, 506b are arranged to emit light onto the at least one non-visible light modulator 516 and the plurality of light modulators 515r, 515g and 515b, respectively, to form the non-visible images 514 and a respective component (513r, 513g, 513b) of visible images 513. The at least one non-visible light source 507 and a plurality of visible light sources 506r, 506g and 506b can be in "on" state continuously or can be turned on and off in a sequence that is coordinated with the non-visible light modulator 516 modulating the non-visible light to form the non-visible images 514 independent of the visible images 513 formed by the plurality of light modulators 515r, 515g and 515b.

The projector head assembly 501 further comprises an optical combiner 520, similar to optical combiner 420, enabled for combining the non-visible images 514 and respective components (513r, 513g, 513b) of the visible images 513 from the light modulators 516 and 515r, 515g, 515b, respectively and directing the combined images to the projection optics 516. The projection optics 516 is enabled to focus the non-visible images 514 and visible images 513 onto the image plane 570. As in FIG. 1, while FIG. 5 depicts the visible images 513 and the non-visible images 514 as being projected in different directions, it is understood that they have been depicted as such for clarity only. Indeed, it is further understood that each of the visible images 513 and the non-visible images 514 are projected in the image plane 570 and are substantially aligned. Hence, a viewer viewing the image plane 570 with and without non-visible image viewing apparatus (e.g. NVIS goggles) will observe that the non-visible images 514 and the visible images 513, respectively, are in alignment.

Each of light modulators 515r, 515g, 515b and the non-visible light modulator 516 can be controlled to operate in parallel or in sequence as desired.

Figure 6:
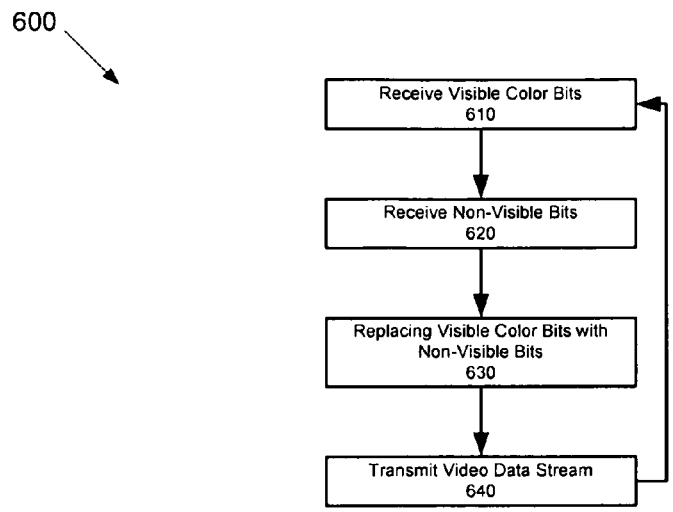
FIG. 6 depicts a method for combining non-visible data and visible data for a projector enabled to project visible images and non-visible images, according to non-limiting embodiments.

Attention is now directed to FIG. 6 which depicts a method 600 for combining non-visible data and visible data for the projector 101. In order to assist in the explanation of the method 600, it will be assumed that the method 600 is performed using the system 100 or any variations that can result by incorporating the light source assembly 105a, the light source assembly 105b, the projector head assembly 401 or the projector head assembly 501 into the system 100. Furthermore, the following discussion of the method 600 will lead to a further understanding of the system 100 and its various components. However, it is to be understood that the system 100 and/or the method 600 can be varied, and need not work exactly as discussed herein in conjunction with each other, and that such variations are within the scope of present embodiments.

At step 610, the visible bits 135, representative of the visible images 113 are received, for example at the processing unit 130. In general, the visible bits 135 are bits in a video stream of images to be projected in a visible light spectrum. In some embodiments, the visible bits 135 can be received from a video apparatus (such as simulation/visualization apparatus, not depicted) external to the system 100. In other embodiments, the visible bits 135 can be stored in a data file in the memory 134 (and/or an external memory, not depicted) and received upon retrieval from the memory 134.

At step 620, non-visible bits 136, representative of the non-visible images 114 are received, for example at the processing unit 130. In general, the non-visible bits 136 are bits in a video stream of images to be projected in a non-visible light spectrum. In some embodiments, the non-visible bits 136 can be received from a video apparatus (such as simulation/visualization apparatus, not depicted) external to the system 100. In other embodiments, the non-visible bits 136 can be stored in a data file in the memory 134 (and/or an external memory, not depicted) and received upon retrieval from the memory 134.

At step 630, a portion of the visible bits 135 are replaced with at least a portion of the non-visible bits 136 in the video data 127 to be transmitted to the projector 101, such that the visible images 113 and the non-visible images 114 can be co-projected by the projector 101 upon processing the video data 127. Step 630 can be performed by the processing unit 130, for example.

At step 640, the video data 127 is transmitted to the projector 101, for example via the interface 132. The projector 101 then processes the video data 127 to co-project the visible images 113 and the non-visible images 114. The image generator 110 can also transmit the coordinating signal 112 to the light source assembly 105 to facilitate coordination of the light modulator 115 with the visible and non-visible light received at the light modulator 115, as described above.

It is understood that steps 610-640 can occur in any suitable order, and/or simultaneously. Further, it is understood that the steps 610-640 can be repeated as desired to transmit the video data 127 to the projector 101 in a video data stream. For example, in a simulation environment, the interface 132 can be enabled to communicate with simulation/visualization apparatus (e.g. a cockpit simulator), which is producing the visible bits 135 and the non-visible bits 136. In essence, each of the visible bits 135 and the non-visible bits 136 represent two streams of video data, representative of the visible images 113 and the non-visible images 114 respectively. The processing unit 130 then combines the two streams of video data by replacing a portion of the visible bits 135 with at least a portion of the non-visible bits 136 in the video data 127 being transmitted to the projector 101.

Figure 7:
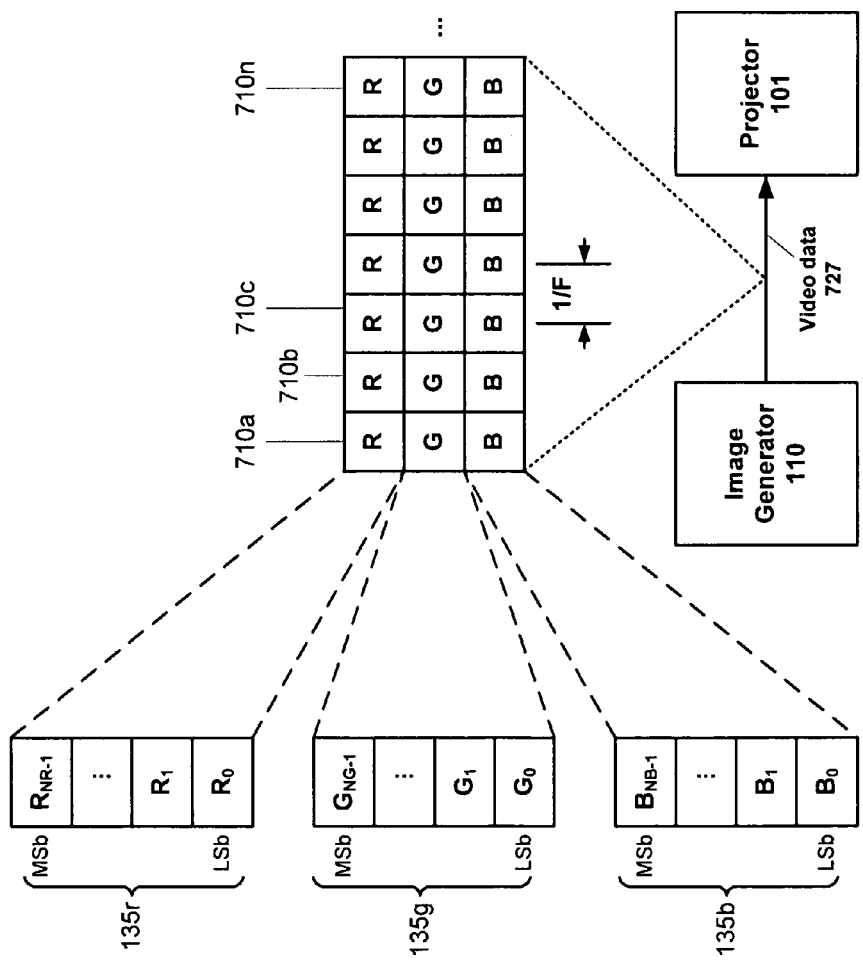
FIG. 7 depicts detail of video data being transmitted from an image generator to a projector, according to the prior art.

For example, attention is directed to FIG. 7 which depicts detail of video data 727 being transmitted from the image generator 110 to the projector 101, in the absence of non-visible bits 136, and hence according to the prior art. The video data 727 comprises a plurality of frames 710a, 710b, 710c ... 710n (generically a frame 710 and collectively frames 710), with each frame comprising pixels, and each pixel comprising red bits 135r, green bits 135g and blue bits 135b (i.e. the visible bits 135). It is understood that the video data 727 comprises as many frames 710 as required to transmit the video data 727, and that the frames 710 are transmitted in a sequence, having a frame period 1/F (F comprising the frame frequency). It is yet further understood that each frame 710 is representative of a visible image 113, and that the projector 101 processes each frame 710 to modulate the light modulator 115 to form each visible image 113.

Each of the red bits 135r, green bits 135g and blue bits 135b comprises a plurality of bits ($R_0, R_1 \ldots R_{NR-1}, G_0, G_1 \ldots G_{NG-1}, B_0, B_1 \ldots B_{NB-1}$, respectively) ranging from a Most Significant bit (MSb) to a Least Significant bit (LSb), as known to a person of skill in the art. For example, in the red bits 135r, the MSb is $R_{NR-1}$ and the LSb is $R_0$. Further, each of the red bits 135r, green bits 135g and blue bits 135b is understood to have a bit depth of N (i.e. N bits in total).

In general, the video data 127 is similar to the video data 727, but with a portion of the visible bits 135 replaced with at least a portion of the non-visible bits 136. Furthermore, various protocols can be used to replace a portion of the visible bits 135 with at least a portion of the non-visible bits 136 in the video data 127. Various non-limiting embodiments of such protocols are described hereafter.

1. Single Color Replacement Protocol

Figure 8:
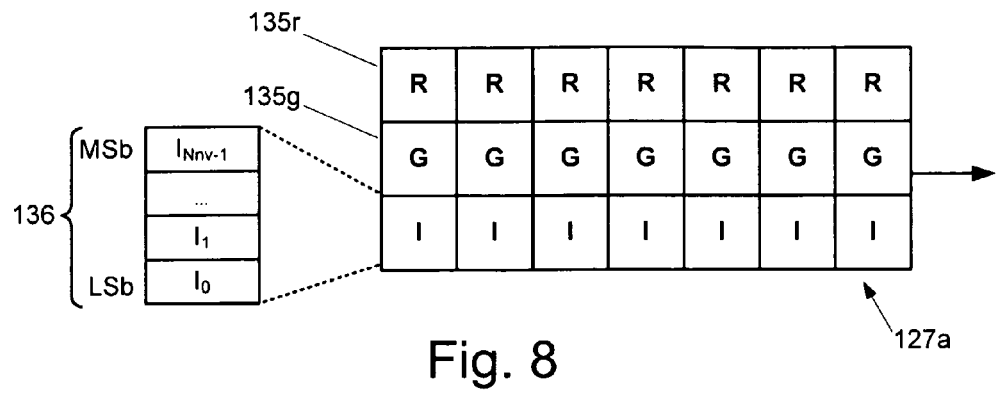
FIGS. 8-16 depict video data where non-visible data and visible data are combined, according to non-limiting embodiments.

Attention is now directed to FIG. 8 which depicts video data 127a, according to non-limiting embodiments. The video data 127a is similar to the video data 127, in which the blue bits 135b ($B_0, B_1 \ldots B_{NB-1}$, as in FIG. 7) have been replaced with the non-visible bits 136, according to non-limiting embodiments. The non-visible bits 136 comprise a plurality of bits ($I_0, I_1 \ldots I_{Nnv-1}$) ranging from a Most Significant bit (MSb) to a Least Significant bit (LSb): the MSb is $I_{Nnv-1}$ and the LSb is $I_0$. Further, the non-visible bits 136 are understood to have a bit depth similar to the visible bits 135.

While the blue bits 135b have been replaced in video data 127a, it is understood that either the red bits 135r or the green bits 135g can be replaced in other non-limiting embodiments. In addition, in some non-limiting embodiments, a portion of each of the red bits 135r, the green bits 135g, and the blue bits 135b can be replaced with a portion of the non-visible bits 136, such that the bit depth of each of the red bits 135r, the green bits 135g, and the blue bits 135b is reduced, but no one component is eliminated.

Furthermore, it is understood that each RGI triplet in the video data 127a (i.e. each RGI triplet depicted in columns) represents a frame of the video data 127a, and that the blue bits 135b have been replaced with the non-visible bits 136 in each frame. Hence, upon processing by the projector 101, the red bits 135r, the green bits 135g and the non-visible bits 136 can be extracted. The red bits 135r and the green bits 135g are then used to produce the visible images 113 and the non-visible bits 136 are used to produce the non-visible images 114. For example, the light modulator 115 is modulated in each frame using the red bits 135r, the green bits 135g and the non-visible bits 136 in a sequence (e.g. in coordination with red, green and non-visible light that is being directed to the light modulator 115, in a sequence as described above).

Alternatively, in embodiments that comprise the projector head assembly 401 or the projector head assembly 501, the red bits 135r, the green bits 135g and the non-visible bits 136 can be used to modulate the appropriate light modulator 415r (or 515r), 415g (or 515g) and 416 (or 516), respectively.

Table 1 provides further characteristics of the protocol depicted in FIG. 8, where "I" represents the non-visible images 114, and "R", "G" and "B" represent the respective red, green and blue components of the visible images 113:

TABLE 1

Characteristics of Single Color Replacement Protocol

| Color | Frame Rate | Bit Depth | Brightness |
|---|---|---|---|
| R | F | N | 1 |
| G | F | N | 1 |
| B | | | |
| I | F | N | 1 |

Hence, as described in Table 1, each of the red and green components of the visible images 113, as well as the non-visible images 114, have a frame rate of F, a bit depth of N and a normalized brightness of 1 (i.e. full brightness of the projector 101 based on the intensity of the visible and non-visible light being transmitted to the projector 101 by the light source assembly 105).

While the blue component of the visible images 113 is not present in these embodiments, in many simulation and/or visualization environments the trade-off between loss of the blue component versus the full frame rate projection of the non-visible images 114 (aligned with the visible images 113) is acceptable. For example, in cockpit simulators simulating certain conditions, and in which the non-visible images 114 comprise IR images, there can be little need for the blue component and/or a portion of the blue component data can be incorporated into the green component data. For example, in high brightness situations, humans are less sensitive to the color blue and hence loss of the blue component will be less noticeable to the naked eye than loss of other colors. Hence the dynamic range of the blue component of the visible images 113 can be reduced and/or the blue component can be eliminated. However, in low brightness conditions, humans are more sensitive to the color blue and less sensitive to the color red. Hence, in other embodiments it can be desirable to reduce and/or eliminate the red component of the visible images 113. In general, however, it is understood that the color which is replaced with the non-visible bits 136 can be adjusted according to the simulation conditions.

2. High Dynamic Range Single Color Replacement Protocol

Figure 9:
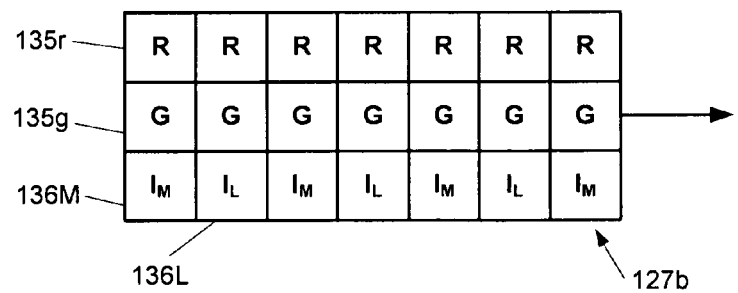

Attention is now directed to FIG. 9 which depicts video data 127b, according to non-limiting embodiments. The video data 127b is similar to the video data 127a, in which the replacing the blue bits 135b with the non-visible bits 136 alternates between with most significant non-visible bits 136M (i.e. $I_M$) and least significant non-visible bits 136L (i.e. $I_L$) in successive frames of the video data 127b. For example, as described above with reference to FIG. 8, in some embodiments the non-visible bits 136 comprise a plurality of bits ($I_0$, $I_1 \ldots I_{Nnv-1}$) ranging from a Most Significant bit (MSb) to a Least Significant bit (LSb), and with a bit depth of N. However, the total bit depth of the non-visible bits 136 in the protocol depicted in FIG. 9 is 2N, as each of the most significant non-visible bits 136M and least significant non-visible bits 136L have a bit depth of N (i.e. N bits are transmitted per frame). In other words, twice as much data (e.g. dynamic range) in the non-visible images 114 can be transmitted in the protocol depicted in FIG. 9, but at half the frame rate (F/2). The frame rate is F/2 as it takes two frames for all of the data associated with a single non-visible image 114 to be transmitted/received at the projector 101.

While the blue bits 135b have been replaced in the video data 127b, it is understood that either the red bits 135r or the green bits 135g can be replaced in other non-limiting embodiments. In addition, in some non-limiting embodiments, a portion of each of the red bits 135r, the green bits 135g, and the blue bits 135b can be replaced with a portion of the non-visible bits 136, such that the bit depth of each of the red bits 135r, the green bits 135g, and the blue bits 135b is reduced, but no one component is eliminated.

Table 2 provides further characteristics of the protocol depicted in FIG. 9, where "I" represents the non-visible images 114, and "R", "G" and "B" represent the respective red, green and blue components of the visible images 113:

TABLE 2

Characteristics of High Dynamic Range Single Color Replacement Protocol

| Color | Frame Rate | Bit Depth | Brightness |
|---|---|---|---|
| R | F | N | 1 |
| G | F | N | 1 |
| B | | | |
| I | F/2 | 2N | 1 |

Hence, as described in Table 2, each of the red and green components of the visible images 113 have a frame rate of F, a bit depth of N and a normalized brightness of 1. However, the non-visible images 114 have a frame rate of F/2, a bit depth of 2N and a normalized brightness of 1. Hence, while the frame rate is slower, the non-visible images 114 have a higher dynamic range (i.e. a bit depth of 2N) as compared with the protocol of FIG. 8 or the visible images 113.

3. Single Color Replacement Alternating Frames Protocol

Figure 10:
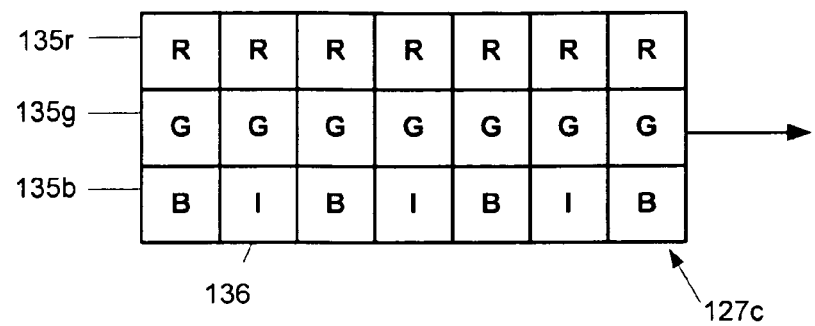

Attention is now directed to FIG. 10 which depicts video data 127c, according to non-limiting embodiments. The video data 127c is similar to the video data 127a; however in video data 127c, the non-visible bits 136 replace the blue bits 136 in every second frame of the video data 127c. In this manner, the blue bits 135b are transmitted to the projector 101, in contrast with video data 127a and video data 127b, however, at a frame rate of F/2. Similarly the non-visible bits 136 are transmitted to the projector 101, also at a frame rate of F/2. This enables a dynamic range (i.e. a bit depth of N) that is the same for each of the red bits 135r, the green bits 135g, the blue bits 135g and the non-visible bits 136.

While the blue bits 135b have been replaced in the video data 127c, it is understood that either the red bits 135r or the green bits 135g can be replaced in other non-limiting embodiments. In addition, in some non-limiting embodiments, a portion of each of the red bits 135r, the green bits 135g, and the blue bits 135b can be replaced with a portion of the non-visible bits 136, such that the bit depth of each of the red bits 135r, the green bits 135g, and the blue bits 135b is reduced, but no one component is eliminated.

Table 3 provides further characteristics of the protocol depicted in FIG. 10, where "I" represents the non-visible images 114, and "R", "G" and "B" represent the respective red, green and blue components of the visible images 113:

TABLE 3

Characteristics of Single Color Replacement
Alternating Frames Protocol

| Color | Frame Rate | Bit Depth | Brightness |
|---|---|---|---|
| R | F | N | 1 |
| G | F | N | 1 |
| B | F/2 | N | 0.5 |
| I | F/2 | N | 0.5 |

Hence, as described in Table 3, each of the red and green components of the visible images 113 have a frame rate of F, a bit depth of N and a normalized brightness of 1. However, the blue bits 135b and the non-visible images 114 have a frame rate of F/2, and a bit depth of N. Furthermore, as the blue component of the visible images 113, as well as the non-visible images 114, are "on" for only half the time as the red and green components of the visible images 113 and hence the normalized brightness of each is 0.5. In some embodiments, this can be addressed by increasing the gain on the blue video data (i.e. the blue bits 135b) and the non-visible bits 136. However, if the blue bits 135b have a generally high amplitude (e.g. substantially close to maximum amplitude) such that an increase in gain results in saturation, then either the red bits 135r or the green bits 135g can be replaced instead of the blue bits 135b.

In other embodiments the lower brightness of the blue component of the visible images 113, as well as the non-visible images 114, can be addressed by: increasing the amplitude of either the broadband light source 109 when the light modulator 115 is being modulated to form either the blue component of the visible images 113 and/or the non-visible images 114; or by increasing the amplitude of a blue light source (e.g. 206b and/or 506b) and/or at least one non-visible light source (e.g. 107, 107b, and/or 507). In further respective embodiments, a further trade-off can be made where the interval between replacements is extended from every second frame to every third, fourth, fifth frame etc. The resulting frame rate of the visible bits or non-visible bits would be F/3, F/4, F/5, etc., and brightness ⅓, ¼, ⅕, etc.

4. Alternating Color Replacement Alternating Frames Protocol

Figure 11:
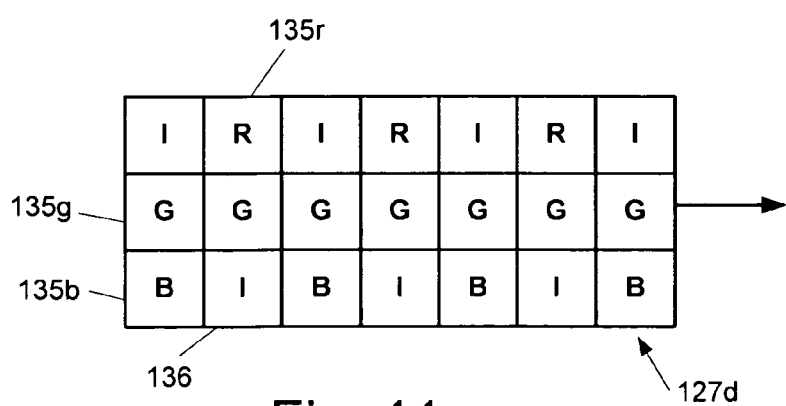

Attention is now directed to FIG. 11 which depicts video data 127d, similar to the video data 127c, according to non-limiting embodiments. However, in video data 127d, replacing a first one of the red bit 135r, the green bit 135g and the blue bits 135b with the non-visible bits 136 alternates with replacing of a second one of the red bit 135r, the green bit 135g and the blue bits 135b with the non-visible bits 136 in successive frames of the video data 127d and, in the depicted embodiment, specifically alternating between replacing red bits 135r and blue bits 135b with the non-visible bits 136.

While the red bits 135r and the blue bits 135b have been replaced in the video data 127d, it is understood that any two of the red bits 135r, the green bits 135g and the blue bits 135b can be replaced in other non-limiting embodiments. Furthermore, in other non-limiting embodiments, a third one of the red bits 135r, the green bits 135g can be replaced with non-visible bits 136 in further successive frames of the video data 127d, and in any desired order (for example IGB, RIB, RGI, etc.).

Table 4 provides further characteristics of the protocol depicted in FIG. 11, where "I" represents the non-visible images 114, and "R", "G" and "B" represent the respective red, green and blue components of the visible images 113:

TABLE 4

Characteristics of Single Color Replacement
Alternating Frames Protocol

| Color | Frame Rate | Bit Depth | Brightness |
|---|---|---|---|
| R | F/2 | N | 0.5 |
| G | F | N | 1 |
| B | F/2 | N | 0.5 |
| I | F | N | 1 |

Hence, as described in Table 4, the green component of the visible images 113, as well as the non-visible images 114, have a frame rate of F and a normalized brightness of 1. However, the red bits 135r and the blue bits 135b have a frame rate of F/2 and normalized brightness of 0.5 (which can be addressed, as described above with reference to FIG. 10). Nonetheless, all of the components of the visible images 113 and the non-visible images 114 have the same dynamic range (i.e. bit depth N).

5. Reduced Bit Depth Single Color Protocol

Figure 12:
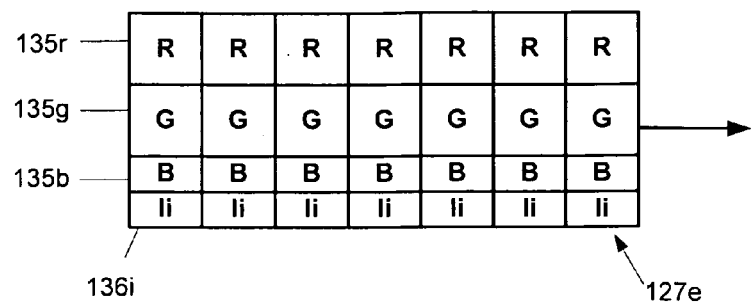

Attention is now directed to FIG. 12 which depicts video data 127e, similar to the video data 127, according to non-limiting embodiments. However, in video data 127e, only a portion of the blue bits 135b have been replaced with a portion 136i (e.g. Ii), of the non-visible bits 136, the portion 136i having a bit depth of Ni. Hence, the blue bits 135b have a bit depth of N−Ni. In some embodiments, the portion 136i can comprise the Ni most significant bits of the non-visible bits 136, while in other embodiments the portion 136i can comprise the Ni least significant bits of the non-visible bits 136.

While the blue bits 135b have been replaced in the video data 127e, it is understood that either the red bits 135r or the green bits 135g can be replaced in other non-limiting embodiments. In addition, in some non-limiting embodiments, a portion of each of the red bits 135r, the green bits 135g, and the blue bits 135b can be replaced with a portion of the non-visible bits 136, such that the bit depth of each of the red bits 135r, the green bits 135g, and the blue bits 135b is reduced, but no one component is eliminated.

Table 5 provides further characteristics of the protocol depicted in FIG. 12, where "I" represents the non-visible images 114, and "R", "G" and "B" represent the respective red, green and blue components of the visible images 113:

TABLE 5

Characteristics of Reduced Bit Depth Single Color Protocol

| Color | Frame Rate | Bit Depth | Brightness |
|---|---|---|---|
| R | F | N | 1 |
| G | F | N | 1 |
| B | F | N–Ni | 1 |
| I | F | Ni | 1 |

Hence, as described in Table 5, all components of the visible images 113, as well as the non-visible images 114, have a frame rate of F and a normalized brightness of 1. However, the blue bits 135b have reduced dynamic range (i.e. bit depth of N–Ni) than the red bits 135r and the green bits 135g. Further the non-visible images 114 have a dynamic range (i.e. bit depth of Ni) which is smaller than the red bits 135r and the green bits 135g. Hence, in some embodiments, a component of the visible images 113 that has the smallest dynamic range is selected to be the color in which bits are replaced. If the dynamic range requirements of the components change, so can the color that is selected to be the color in which bits are replaced.

6. High Dynamic Range Reduced Bit-Depth Single Color Protocol

Figure 13:
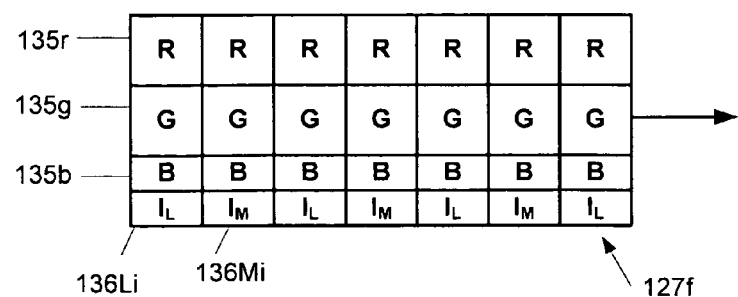

Attention is now directed to FIG. 13 which depicts video data 127f, similar to the video data 127e, according to non-limiting embodiments. However, in video data 127f, only a portion of the blue bits 135b are replaced with more significant non-visible bits 136Mi and less significant non-visible bits 136Li in successive frames of the video data 127f. Further, each of the more significant non-visible bits 136Mi and less significant non-visible bits 136Li have a bit depth of Nj, and hence the blue bits 135b have a bit depth of N–Nj.

While the blue bits 135b have been replaced in the video data 127f, it is understood that either the red bits 135r or the green bits 135g can be replaced in other non-limiting embodiments. In addition, in some non-limiting embodiments, a portion of each of the red bits 135r, the green bits 135g, and the blue bits 135b can be replaced with a portion of the non-visible bits 136, such that the bit depth of each of the red bits 135r, the green bits 135g, and the blue bits 135b is reduced, but no one component is eliminated.

Table 6 provides further characteristics of the protocol depicted in FIG. 13, where "I" represents the non-visible images 114, and "R", "G" and "B" represent the respective red, green and blue components of the visible images 113:

TABLE 6

Characteristics of High Dynamic Range Reduced Bit-Depth Single Color Protocol

| Color | Frame Rate | Bit Depth | Brightness |
|---|---|---|---|
| R | F | N | 1 |
| G | F | N | 1 |
| B | F | N–Nj | 1 |
| I | F/2 | 2Nj | 0.5 |

Hence, as described in Table 6, all components of the visible images 113 have a frame rate of F and a normalized brightness of 1. The non-visible images 114 have a frame rate of F/2, and a reduced brightness (which can be addressed, as described above with reference to FIG. 10). The blue bits 135b have reduced dynamic range (i.e. bit depth of N–Nj) as compared to the red bits 135r and the green bits 135g. However, the non-visible images 114 can have an increased dynamic range, for example over the protocol described with reference to FIG. 11. In some embodiments, a component of the visible images 113 that has the smallest dynamic range is selected to be the color in which bits are replaced. If the dynamic range requirements of the components change, so can the color that is selected to be the color in which bits are replaced.

7. Very High Dynamic Range Alternating Frames Protocol

Figure 14:
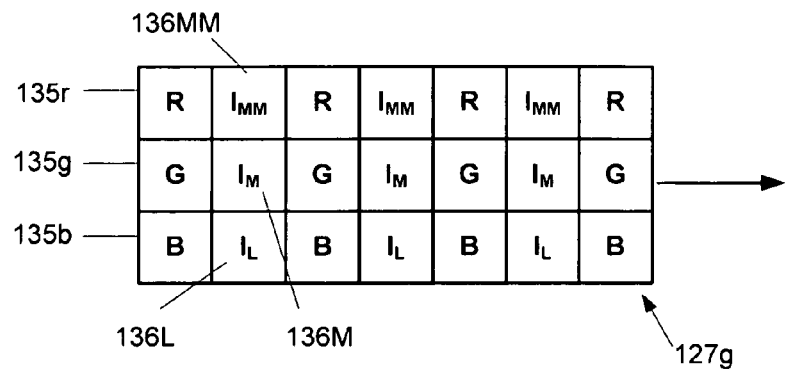

Attention is now directed to FIG. 14 which depicts video data 127g, similar to the video data 127, according to non-limiting embodiments. However, in video data 127g, each of the red bits 135r, the green bits 135g and the blue bits 135b are replaced with at least a portion of the non-visible bits in alternating successive frames of the video data 127g. For example, in non-limiting embodiments, each of the red bits 135r, the green bits 135g and the blue bits 135b are replaced with non-visible bits 136MM, 136M and 136L. In these embodiments the non-visible bits 136 have a bit depth of 3N, and the non-visible bits 136 are divided into the non-visible bits 136MM, 136M and 136L, where the non-visible bits 136MM comprise the "most" most significant bits, the non-visible bits 136M comprise the most significant bits, and the non-visible bits 136L comprise the least significant bits. It is understood that which of the non-visible bits 136MM, 136M and 136L replaces which of the red bits 135r, the green bits 135g and the blue bits 135b is generally non-limiting. It is further understood, in these embodiments, that the projector 101 is enabled to project a large dynamic range of brightness in the non-visible spectrum.

Table 7 provides further characteristics of the protocol depicted in FIG. 14, where "I" represents the non-visible images 114, and "R", "G" and "B" represent the respective red, green and blue components of the visible images 113:

TABLE 7

Characteristics of Very High Dynamic Range Alternating Frames Protocol

| Color | Frame Rate | Bit Depth | Brightness |
|---|---|---|---|
| R | F/2 | N | 0.5 |
| G | F/2 | N | 0.5 |
| B | F/2 | N | 0.5 |
| I | F/2 | 3N | 0.5 |

Hence, as described in Table 7, all components of the visible images 113, as well as the non-visible images, have a frame rate of F/2 and a normalized brightness of 0.5 (which can be addressed, as described above with reference to FIG. 10). Furthermore, all components of the visible images 113 have the same dynamic range (e.g. a bit depth of N) and, in comparison, the non-visible images 114 have a very high dynamic range (bit depth of 3N).

8. High Dynamic Range Alternating Frames Protocol

Figure 15:
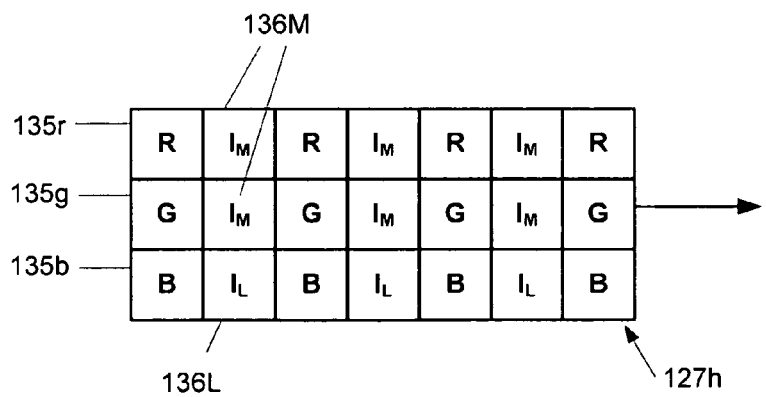

Attention is now directed to FIG. 15 which depicts video data 127h, similar to the video data 127g, according to non-limiting embodiments. However, in video data 127h, two of the red bits 135r, the green bits 135g and the blue bits 135b are replaced with the non-visible bits 136M, and one of the red bits 135r, the green bits 135g and the blue bits are replaced with the non-visible bits 136L. In these embodiments, the non-visible bits 136 have a bit depth of 2N, and it is understood that the non-visible light that impinges on the light modulator 115 can be adjusted to $2^{-(N+1)}$ brightness. Hence the non-visible most significant bits (i.e. non-visible bits 136M) are duplicated so that so that the brightness of non-visible images 114 are doubled, with respect to the visible images 113, while retaining fine gradations in brightness. This can be useful in simulating "busy" environments in night vision images, such as tree canopies (e.g. in cockpit simulators).

Table 8 provides further characteristics of the protocol depicted in FIG. 15, where "I" represents the non-visible images 114, and "R", "G" and "B" represent the respective red, green and blue components of the visible images 113:

TABLE 8

Characteristics of High Dynamic
Range Alternating Frames Protocol

| Color | Frame Rate | Bit Depth | Brightness |
|-------|------------|-----------|------------|
| R | F/2 | N | 0.5 |
| G | F/2 | N | 0.5 |
| B | F/2 | N | 0.5 |
| I | F/2 | 2N | 1 |

Hence, as described in Table 8, all components of the visible images 113, as well as the non-visible images 114, have a frame rate of F/2. The visible images 113 have a normalized brightness of 0.5 (which can be addressed, as described above with reference to FIG. 10), and the non-visible images 114 have a normalized brightness of 1Furthermore, all components of the visible images 113 have the same dynamic range (e.g. a bit depth of N) and, in comparison, the non-visible images 114 have a high dynamic range (bit depth of 2N).

9. High Dynamic Range Monochrome Protocol

Figure 16:
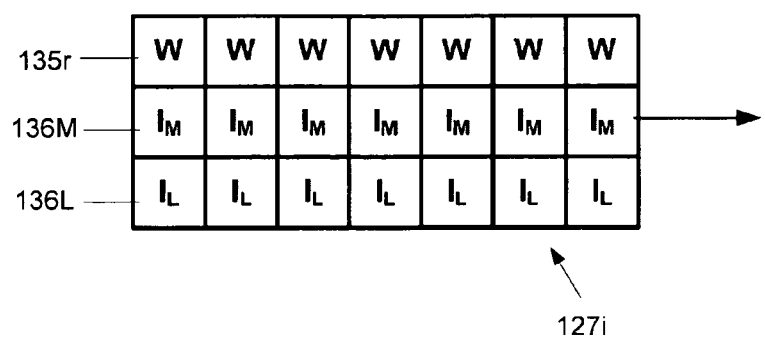

Attention is now directed to FIG. 16 which depicts video data 127*i*, similar to the video data 127*a*, according to non-limiting embodiments. However, in video data 127*i*, one of the red bits 135*r*, the green bits 135*g* and the blue bits 135*b* are replaced with the non-visible bits 136M, and another of the red bits 135*r*, the green bits 135*g* and the blue bits are replaced with the non-visible bits 136L in each frame. The result is that one of the red bits 135*r*, the green bits 135*g* and the blue bits 135*b* (e.g. the red bits 135*r*, as depicted) are transmitted to the projector 101 resulting in the visible images 113 being monochrome. Further, in these embodiments, the visible bits 135 that are being transmitted can be processed such that all of the monochrome image data is contained in the one of the red bits 135*r*, the green bits 135*g* and the blue bits 135*b* that is being transmitted. Hence, in these embodiments, it is understood that the visible bits ("W") that are being transmitted are not limited red, green or blue data but can represent some combination of red, green and blue data that have been transformed into monochrome data according to a pre-determined algorithm, and/or originated as monochrome data.

In some these embodiments, the projector 101 can be placed in a monochrome mode, such that the broadband light source 109 illuminates the light modulator 115 (or one or more of the light modulators 415*r*, 415*g* and 415*b*) such that the visible images 113 are projected in a black/white/grey color scheme.

Table 9 provides further characteristics of the protocol depicted in FIG. 19, where "I" represents the non-visible images 114, and "W" represents the visible images 113 being projected in a monochrome mode:

TABLE 9

Characteristics of High Dynamic Range Monochrome Protocol

| Color | Frame Rate | Bit Depth | Brightness |
|-------|------------|-----------|------------|
| W | F | N | 1 |
| I | F | 2N | 1 |

Hence, as described in Table 9, the monochrome visible images 113, as well as the non-visible images 114, have a frame rate of F and a normalized brightness of 1. Furthermore, the non-visible images 114 have a high dynamic range (bit depth of 2N) as compared to the monochrome visible images 113, which have a bit depth of N.

While nine different protocols, and variations, for replacing a portion of the visible bits 135 with at least a portion of the non-visible bits 136 in the video data 127 have been described, other protocols that can occur in light of present embodiments are within the scope of the present specification.

Hence, by replacing a portion of the visible bits 135 with at least a portion of the non-visible bits 136 in the video data 127, and providing the projector 101 that is enabled to process the video data 127, modulate non-visible light to form the non-visible images 114 independent of the visible images 113, and further co-project the visible images 113 and non-visible images 114 in alignment (i.e. through the same projection optics 116), simulation/visualization environments that make use of the non-visible images 114 are generally simplified. Examples of such simulation/visualization environments include, but are not limited to, cockpit simulators and/or flight trainers and/or driving simulators that are enabled for a night vision mode (e.g. a user can utilize night vision goggles), and driving simulators that include IR image detectors, wherein detected IR images can be projected in a visible light spectrum in a heads up display. Other simulation/visualization environments that can occur to a person of skill in the art are within the scope of present embodiments.

Those skilled in the art will appreciate that in some embodiments, the functionality of the projector 101, the light source assemblies 105, 105*a* and 105*b*, the image generator 110, and the projector head assemblies 401 and 501 can be implemented using pre-programmed hardware or firmware elements (e.g., application specific integrated circuits (ASICs), electrically erasable programmable read-only memories (EEPROMs), etc.), or other related components. In other embodiments, the functionality of the projector 101, the light source assemblies 105, 105*a* and 105*b*, the image generator 110, and the projector head assemblies 401 and 501 can be achieved using a computing apparatus that has access to a code memory (not shown) which stores computer-readable program code for operation of the computing apparatus: The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A system for projecting visible and non-visible images comprising:
   a visible light source enabled to emit visible light;
   a non-visible light source enabled to emit non-visible light;
   at least one light modulator enabled to receive and modulate said visible light and said non-visible light to respectively form visible images and non-visible images, said non-visible images formed independent of said visible images each of the visible images and non-visible images comprising one or more common features; and
   projection optics enabled to receive and co-project said visible and non-visible images in a same image plane in a simulation or visualization environment such that a viewer viewing the image plane with and without non-visible image viewing apparatus will observe that at least a portion of the one or more common features in both the non-visible images and the visible images, respectively, are in substantial alignment.

2. The system of claim 1, further comprising a processing unit enabled to control said at least one light modulator to modulate said non-visible light to form said non-visible images independent of said visible images.

3. The system of claim 1, further comprising a plurality of light modulators, each of said plurality of light modulators enabled to receive and modulate a respective component of said visible light to form a respective component of said visible images.

4. The system of claim 3, further comprising a plurality of visible light sources, including said visible light source, in a one-to-one relationship with said plurality of light modulators, each of said plurality of visible light sources enabled to emit said respective component of said visible light.

5. The system of claim 3, further comprising:
   a broadband light source comprising said visible light source and said non-visible light source; and
   a spectrum splitter enabled to split light from said broadband light source into said non-visible light and each said respective component of said visible light.

6. The system of claim 5, wherein said spectrum splitter comprises at least one of at least one prism and at least one dichroic filter.

7. The system of claim 1, wherein said at least one light modulator comprises:
   at least one visible light modulator enabled to receive and modulate said visible light to form said visible images; and
   at least one non-visible light modulator enabled to receive and modulate said non-visible light to form said non-visible images independent of said visible images.

8. The system of claim 1, further comprising:
   a broadband light source comprising said visible light source and said non-visible light source; and
   a light filter enabled to separate light from said broadband light source into said non-visible light and a plurality of components of said visible light, in a sequence coordinated with modulation of said non-visible light to form non-visible images independent of said visible images.

9. The system of claim 8, wherein said light filter comprises:
   a plurality of visible light filters, each enabled to transmit one of each said respective component of said visible light and substantially block transmission of said non-visible light; and
   a non-visible light filter enabled to transmit said non-visible light and substantially block said visible light.

10. The system of claim 8, wherein said light filter comprises a color wheel.

11. The system of claim 7, further comprising a plurality of visible light sources, including said visible light source, each of said plurality of visible light sources enabled to emit a respective component of said visible light.

12. The system of claim 11, wherein said plurality of visible light sources and said non-visible light source are enabled to emit each said respective component of said visible light and said non-visible light in a sequence coordinated with modulation of said non-visible light to form non-visible images independent of said visible images.

13. The system of claim 12, wherein said at least one visible light modulator is further enabled to receive light from each said red, green and blue light source and modulate said visible light to form visible images.

14. The system of claim 1, wherein said at least one visible light source comprises at least one of a red, green and blue light source, and said non-visible light source comprises at least one of an infrared and ultra-violet light source.

15. The system of claim 1, wherein each of the visible images and the non-visible images comprise substantially all of the common features.

16. The system of claim 1, wherein each of the visible images and the non-visible images are the same, other than respective wavelength ranges in which they are projected.

17. A light source assembly for providing light to a projector enabled to project visible and non-visible images, each of the visible images and non-visible images comprising one or more common features, the projector including at least one light modulator enabled to receive and modulate visible light and non-visible light to respectively form visible images and non-visible images, said non-visible images formed independent of said visible images, and projection optics enabled to receive and co-project said visible and non-visible images, the light source assembly comprising:
   a visible light source enabled to emit visible light;
   a non-visible light source enabled to emit non-visible light;
   an optical interface enabled to transmit said visible and non-visible light to said projector;
   a communication interface enabled to receive a coordinating signal from an image generator distinct from the light source assembly;
   a processing unit connected to said communication interface, said processing unit enabled to process said coordinating signal and, in response, coordinate transmission of said visible light and non-visible light to said projector with said modulation of said visible light and non-visible light, such that said non-visible images are formed independent of said visible images at said projector and projected in a same image plane in a simulation or visualization environment such that a viewer viewing the image plane with and without non-visible image viewing apparatus will observe that at least a portion of the one or more common features in both the non-visible images and the visible images, respectively, are in substantial alignment.

* * * * *